United States Patent [19]

Dittrich et al.

[11] 3,859,470

[45] Jan. 7, 1975

[54] COMMUNICATION SWITCHING NETWORK

[75] Inventors: Robert George Dittrich, Boulder; Louis Emanuel Thelemaque, Longmont, both of Colo.

[73] Assignee: Bell Telephone Laboratories, Incorporated, Murray Hill, N.J.

[22] Filed: Dec. 1, 1972

[21] Appl. No.: 311,167

[52] U.S. Cl. .......................... 179/18 EA, 179/186 E

[51] Int. Cl. .............................................. H04q 3/42

[58] Field of Search ......... 179/18 G, 18 GE, 18 EA, 179/186, 186 E,

[56] References Cited

UNITED STATES PATENTS

| | | | |
|---|---|---|---|
| 3,310,633 | 3/1967 | Schonemeyer | 179/18 |
| 3,423,537 | 1/1969 | Schluter et al. | 179/18 |
| 3,482,053 | 12/1969 | Braun et al. | 179/18 |
| 3,532,824 | 10/1970 | Schluter et al. | 179/18 |
| 3,532,826 | 10/1970 | Metz et al. | 179/18 |

FOREIGN PATENTS OR APPLICATIONS

| | | | |
|---|---|---|---|
| 1,115,777 | 4/1960 | Germany | 179/18 C |

*Primary Examiner*—William C. Cooper
*Assistant Examiner*—C. T. Bartz
*Attorney, Agent, or Firm*—D. M. Duft

[57] ABSTRACT

A code lead controlled switching system is disclosed having a network which, upon the receipt of information specifying the circuits that are to be connected on a call, propagates a signal through network contacts associated with each path that is currently idle and available for use on a connection between the two specified circuits. If a path is available, the propagated signal controls the operation of the network switches required to establish the connection.

15 Claims, 14 Drawing Figures

Patented Jan. 7, 1975 3,859,470

11 Sheets-Sheet 1

Patented Jan. 7, 1975

3,859,470

11 Sheets-Sheet 6

Patented Jan. 7, 1975 3,859,470

11 Sheets-Sheet 7

Patented Jan. 7, 1975

3,859,470

11 Sheets-Sheet 9

COMMUNICATION SWITCHING NETWORK

BACKGROUND OF THE INVENTION

1. Field of the Invention

Figure 1:
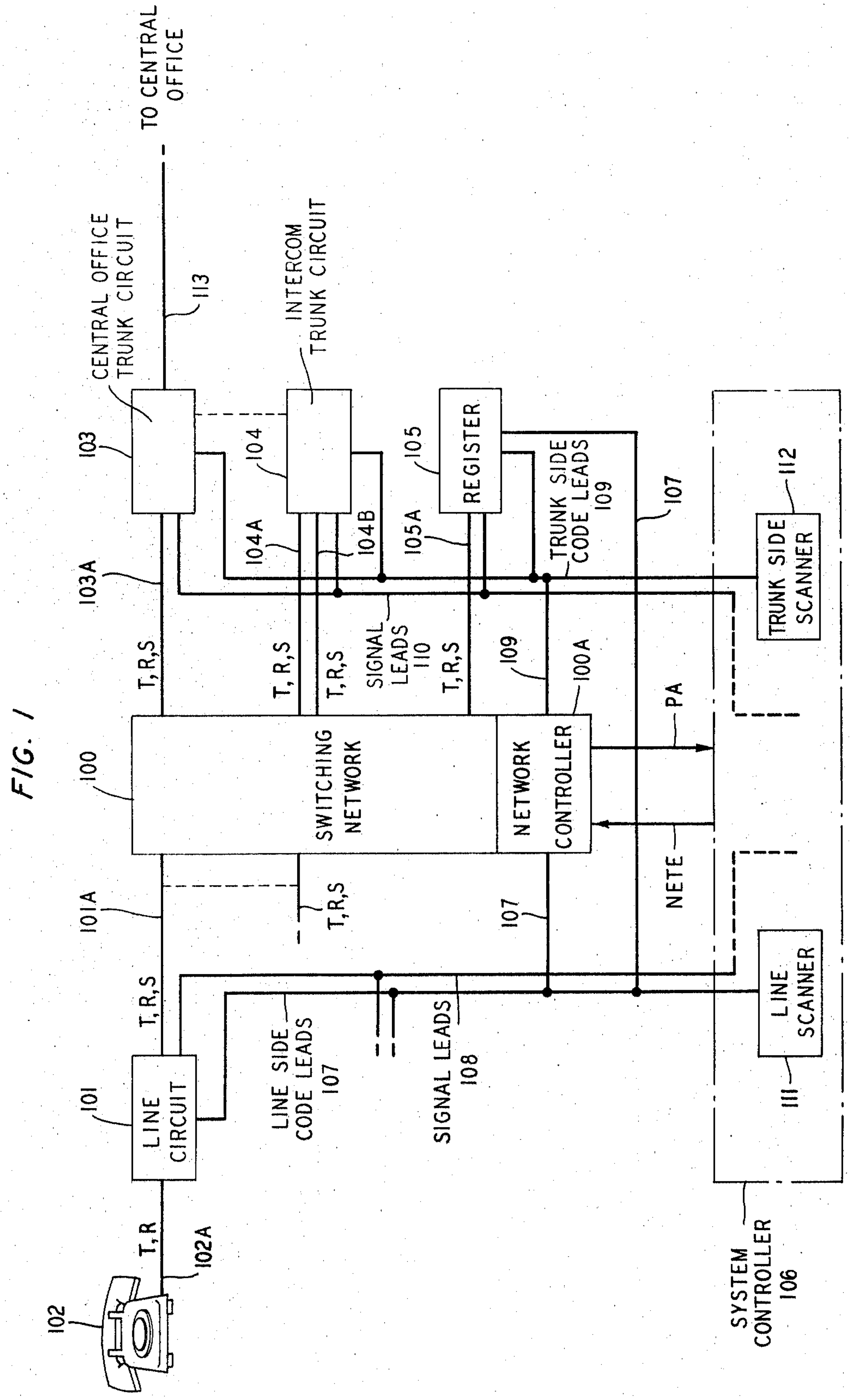

This invention relates to a communication switching system and, in particular, to a system having an improved network controller.

This invention further relates to an improved path hunting and control circuit for the network of a communication switching system.

2. Description of the Prior Art

In systems using matrix or crossbar switch type networks, call connections between the various circuits connected to the network are typically established by a multistep procedure in which a network controller receives a request signal specifying the circuits that are to be connected, hunts for and attempts to find an idle network path between the two specified circuits, and then operates the switch control magnets required to establish the connection. The network controller in these systems is usually a marker or a marker type circuit. The path hunting circuitry of the marker typically comprises logic circuitry and a plurality of relays each of which has many contacts. These relays and their contacts selectively connect the various network links and junctors to the logic circuitry. The logic circuitry examines the idle-busy state of the links and junctors and, if a suitable combination of idle links and junctors extending between the two circuits is found, their identity is noted and used to establish the connection.

Certain systems use scanners and the like to examine the state of the links and the junctors and to report their findings to marker type logic circuitry which then selects and establishes a path in the same manner as in the all relay marker type systems. Other systems avoid the use of markers by using self-steering control circuitry which hunts for and selects a path through a multistage network on a step-by-step basis, one stage at a time. Although this eliminates the cost and complexity of the marker, it results in increased complexity within the network itself. Also it is inherently slower than marker type circuits since the availability of idle paths is determined sequentially stage-by-stage.

The foregoing arrangements for controlling matrix or crossbar type switches are reasonably effective for use in electromechanical type switching systems. However, all of these arrangements require the sequential operation of a plurality of relays in the performance of their path determining and path establishment functions. The time required for these relays to operate is sufficiently great that it has precluded the use of crossbar type networks in electronically controlled switching systems. This is unfortunate since crossbar switches are inherently reliable, relatively inexpensive, and suitable for use in certain types of electronic switching systems, such as, for example, those that use wired logic controllers.

It is, therefore, apparent that it is a problem of the prior art to control the operation of crossbar type networks at speeds that render them suitable for use in electronic switching systems.

BRIEF SUMMARY OF THE INVENTION

Objects

It is an object of the invention to provide an improved network control circuit for a communication switching system.

It is a further object to provide an improved control circuit that operates at the speeds required to permit electromechanical type matrix switches to be used in electronically controlled switching systems.

SUMMARY DESCRIPTION

We provide a network controller having improved path hunting and path establishment circuitry. Our controller overcomes the disadvantages of the prior art arrangements, such as markers and the like, by operating at the speeds required for use in electronically controlled switching systems. This improved speed of operation is achieved by circuitry which minimizes or reduces the number of sequential relay operations required to determine whether a path is available as well as to establish a connection after it is determined that a path is available.

A switching system embodying our invention initiates a request for a network connection by transmitting to our controller the identity of the circuits that are to be interconnected. Upon the receipt of this information, a path hunting potential is generated by circuitry associated with the network switch that serves one of the identified circuits. This potential is then propagated stage-by-stage through the network over contacts associated with each currently idle path extending between two identified circuits. If a path is available, the propagated potential is received by the switch serving the other identified circuit. From there the potential is returned to the controller which then operates the switch control magnets required to establish a network connection between the two circuits.

Further in accordance with our invention, if a plurality of paths are idle and available between the two circuits, a plurality of propagated signals, one for each path, are received by the controller. The controller then selects which path is to be used and operates the control magnets required to establish a connection over the selected path.

The circuitry of our invention is substantially faster than the prior art arrangements due to the fact that a fewer number of sequential relay operations are required to determine whether an idle path is available. Specifically, after the identity of the two circuits to be interconnected is transmitted to the controller, a path hunting signal is generated and immediately propagated through all network stages between the two circuits without the necessity of any additional relays being operated. If a path is available, this indication is immediately made known to the controller by the return of at least one propagated potential to it. The controller then operates the switch control magnets required to establish a connection over the network path associated with the propagated potential. The circuitry that operates the control magnets includes contacts of relays that operated in response to the receipt of the identity information by the controller.

Our invention provides a network controller that is relatively simple and substantially faster in its operation than the prior art arrangements. Consequently, our controller can advantageously permit crossbar type switching networks to be used in electronically controlled switching systems.

FEATURES

A feature of the invention is the provision of a network control circuit which tests for the availability of idle network paths between two specified circuits by propagating a path hunting potential over all idle network paths extending between the two circuits.

A further feature is the provision of circuitry for returning the propagated signal to a network controller as an indication that an idle path is available.

A further feature is the provision of circuitry for operating the network control magnets required to establish the network path associated with the propagated potential returned to the controller.

A further feature is the provision of circuitry for propagating a service request signal from a network switch associated with one of the specified circuits, through idle network paths extending to a network switch associated with another specified circuit, and then to a controller which establishes the network path associated with the propagated signal.

A further feature of the invention is the provision of circuitry for receiving signals specifying the circuits that are to be connected by a network, generating a service request signal at a switch serving one of the specified circuits, propagating the signal through all idle paths extending through the network to a switch serving the other specified circuits, and returning the signal to a network controller for the establishment of a connection between the specified circuits.

A further feature is the provision of circuitry for propagating the network service request signal through idle path contacts of a first network stage, over idle links extending to an intermediate network stage, over idle path contacts of the intermediate stage, over idle junctors extending to a third network stage, over idle path contacts of a third stage and then to the network controller.

A further feature is the provision of circuitry for returning to the controller a separate propagated signal for each network path available between the two specified circuits, and circuitry in the controller for establishing a connection between the two circuits over a preferred one of the plurality of available paths.

DRAWING

Figure 2:
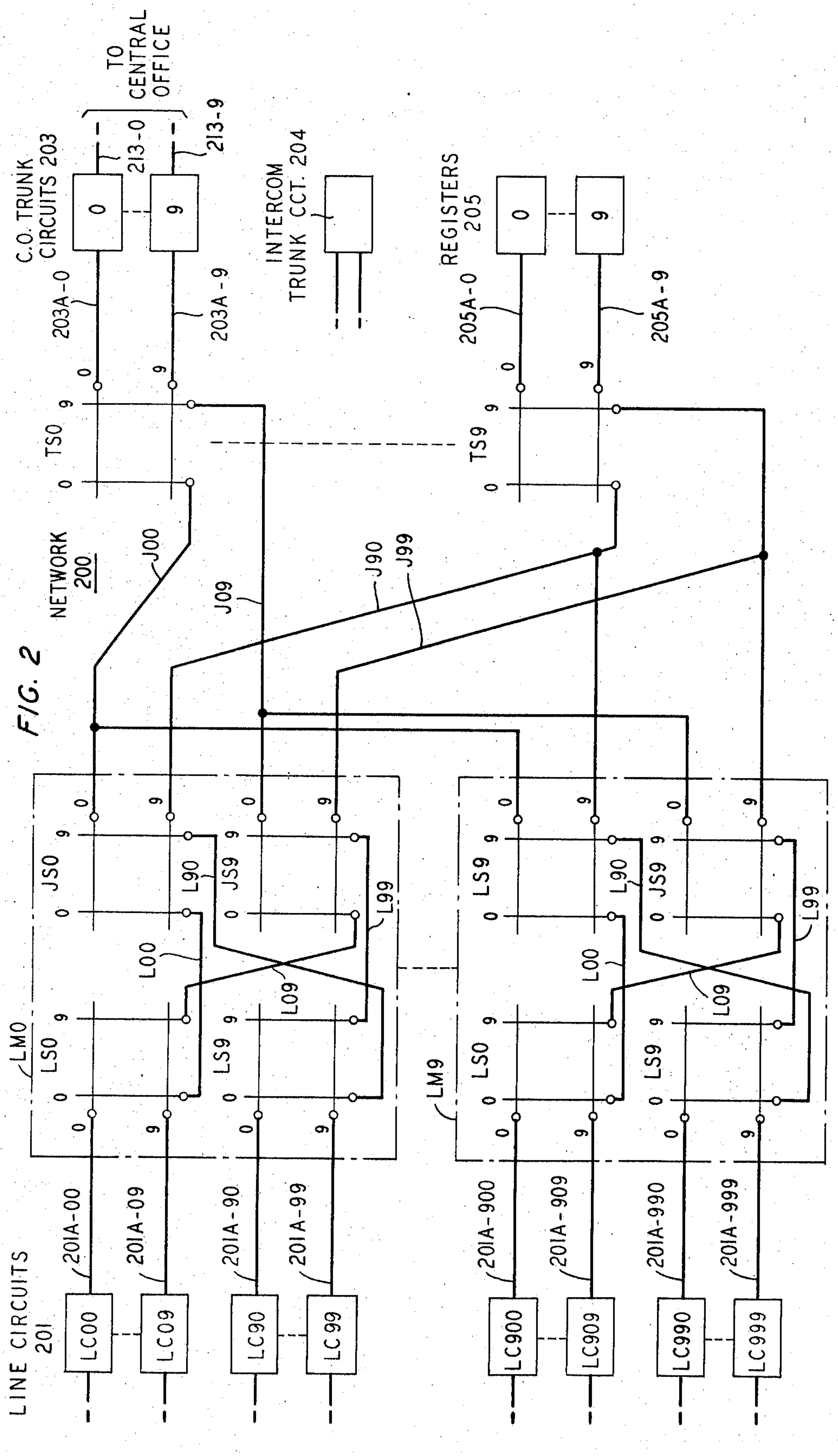

These and other objects and features of the invention will become apparent from the reading of the following description taken in conjunction with the drawing in which;

FIG. 1 diagrammatically discloses an illustrative embodiment of a system embodying our invention;

FIG. 2 discloses the manner in which the switches of a three-stage network embodying our invention are interconnected; and FIGS. 3A, 3B, 3C, and 3D, FIGS. 4A, 4B, 4C, and FIGS. 5A, 5B, 5C, and 5D disclose additional details of our invention.

GENERAL DESCRIPTION - FIG. 1

One possible embodiment of our invention is shown on FIG. 1 as indicated in a PBX having a plurality of stations 102 (of which only one is shown), corresponding line circuits 101, a switching network 100, central office trunk circuits 103, intercom trunk circuits 104, and registers 105. Only a single register and a single trunk circuit of each type is shown.

The line circuits are connected to the left side of a network via a corresponding conductor path 101A. The intercom trunk circuits 104 are connected to the right side of the network by paths 104A and 104B; the central office trunk circuits 103 and the registers 105 are connected to the right side of the network by paths 103A and 105A respectively. The system further includes a system controller 106 having a line scanner 111 and a trunk side scanner 112. The controller cooperates with the other elements of the system of FIG. 1 to control the system in the performance of its call serving functions.

The system of FIG. 1 is effective to serve various types of calls including (1) intra-PBX calls between stations of the PBX, (2) outgoing calls to a central office, and (3) incoming calls from the central office. Intra-PBX calls are completed from a calling station, through its line circuit, through a first path of the switching network 101, through an intraoffice trunk circuit, over a second path of the network to the called line circuit, and from there to the called station. Outgoing central office calls are extended from the calling station and its line circuit, through the network, through an idle central office trunk circuit 103 and the associated line 113 to the central office. Incoming central office calls are extended from the central office trunk circuit that receives the call, through the switching network 100, to the called line via its line circuit. The manner in which the entire system of FIG. 1 serves the various types of calls does not comprise any portion of our invention, is known in the art, and is therefore not described in further detail.

The system controller 106 is connected to the line circuits by means of the line side code leads 107 and the signal leads 108. The controller is connected to the trunk side circuits including the trunk circuits and the registers by means of the trunk side code leads 109 and the signal leads 110. In a manner well known in the art, the line scanner, the line side code leads, and the signal leads 108 permit the system controller to identify line circuits requesting service at the initiation of a call, select called line circuits and to detect supervisory change of states in the line circuits. Calling lines are identified under control of a line scanner which applies coded signals to the code leads 107. Called line circuits are selected under control of a register 105 which applies signals to code leads 107 to identify the called line circuit to which a call connection is to be extended.

In a similar manner, the trunk side scanner 112 is used when a trunk side circuit, such as a trunk or a register, is to be selected for use in serving a call. At such times, the trunk side scanner selects an idle trunk side circuit of the required type by applying coded signals to code leads 109. The line side signal leads 108 and the trunk side signal leads 110 return signals to the system controller advising it of the change of state of the line circuits and the trunk side circuits respectively. The line side code leads 107 are connected to the left side of the network controller 100A; the trunk side code leads 109 are connected to the right side of the network controller. Signals identifying the line side circuits and the trunk side circuits that are to be interconnected by the network are applied to the controller 100A via the code leads.

Conductor NETE, which extends from the system controller to the network controller, causes the network controller to establish a network path between the circuits identified by the currently applied line side and trunk side code lead signals. The network controller returns a signal to the system controller over conductor PA indicating that a path is available. The manner in which the network controller receives signals from the code leads and establishes the requested path is subsequently described in further detail.

DESCRIPTION OF FIG. 2

FIG. 2 illustrates how a plurality of matrix type switches may be arranged and interconnected with each other to form a multistage network; this figure also shows how the line circuits, trunks, and registers are connected to appearances of the network. The network of FIG. 2 is of the three-stage type; it includes ten two-stage line modules designated LM0 through LM9; it further includes ten trunk switches designated TS0 through TS9. Each line module itself is a two-stage network and contains 10 line switches and 10 junctor switches. The 10 line switches of a module are designated LS0 through LS9; the 10 junctor switches are designated JS0 through JS9. The horizontals of the line switches are connected to the line circuits over the indicated conductors 201A; the verticals of the line switches are connected via links to the verticals of the junctor switches; the horizontals of the junctor switches are connected via junctors to verticals of the trunk switches. The various trunk circuits and registers are, in turn, connected to the horizontals of the trunk switches.

Thus, the 10 horizontals of trunk switch TS0 are connected to 10 central office trunk circuits, the 10 horizontals of trunk switch 9 are connected to ten registers, while the intercom trunk circuits 204 are connected to others of the trunk switches that are not shown in detail on FIG. 2. The horizontals of each junctor switch of a module are connected in parallel to the corresponding horizontal of the corresponding switch of each other line module. Thus, horizontal 0 of junctor switch 0 of line module 0 is connected to the 0 horizontal of the junctor switch 0 of each other line module. Additionally, the parallel connected junctor switch horizontals are also connected over an appropriate junctor to the vertical of a trunk switch. For example, horizontal 0 of the junctor switch 0 of each module is connected in parallel and then via junctor J00 to vertical 0 of trunk switch 0. The network configuration of FIG. 2 permits the line circuits served by the line switches of any module to be connected to any trunk switch and, in turn, to any of the trunk side circuits served by the trunk switch.

DESCRIPTION OF FIG. 3

Figure 3A:
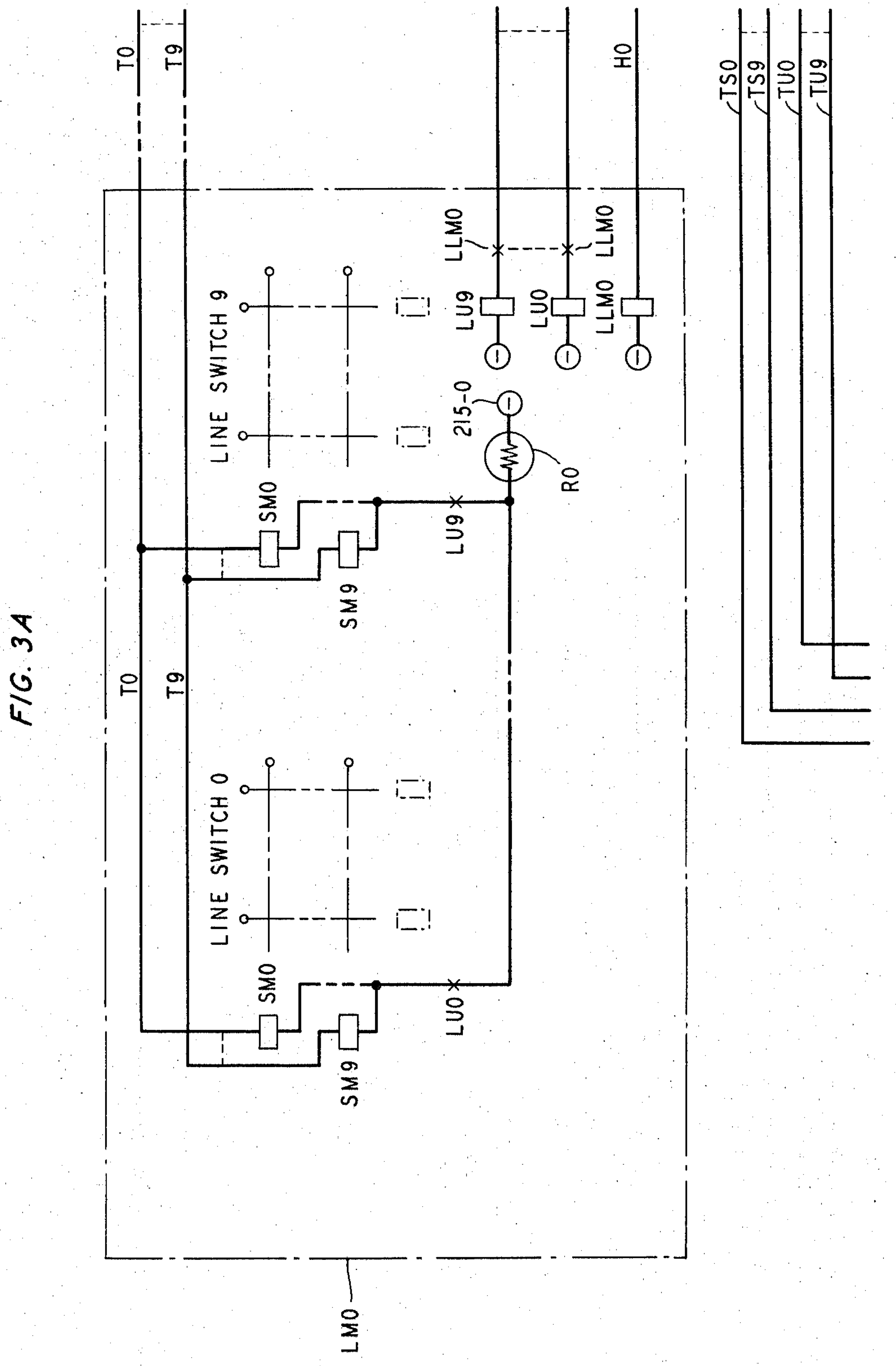
Figure 3B:
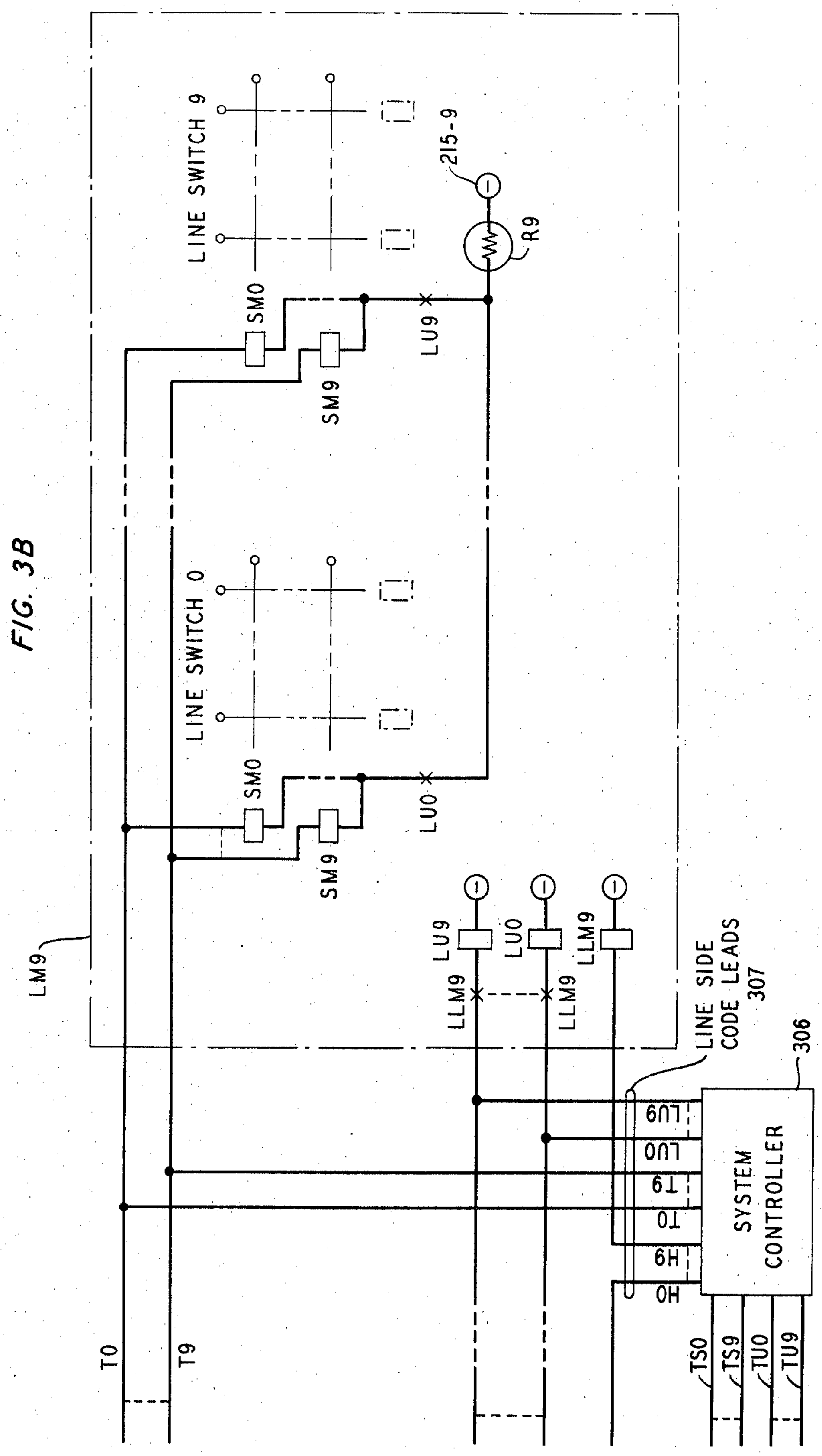
Figure 3C:
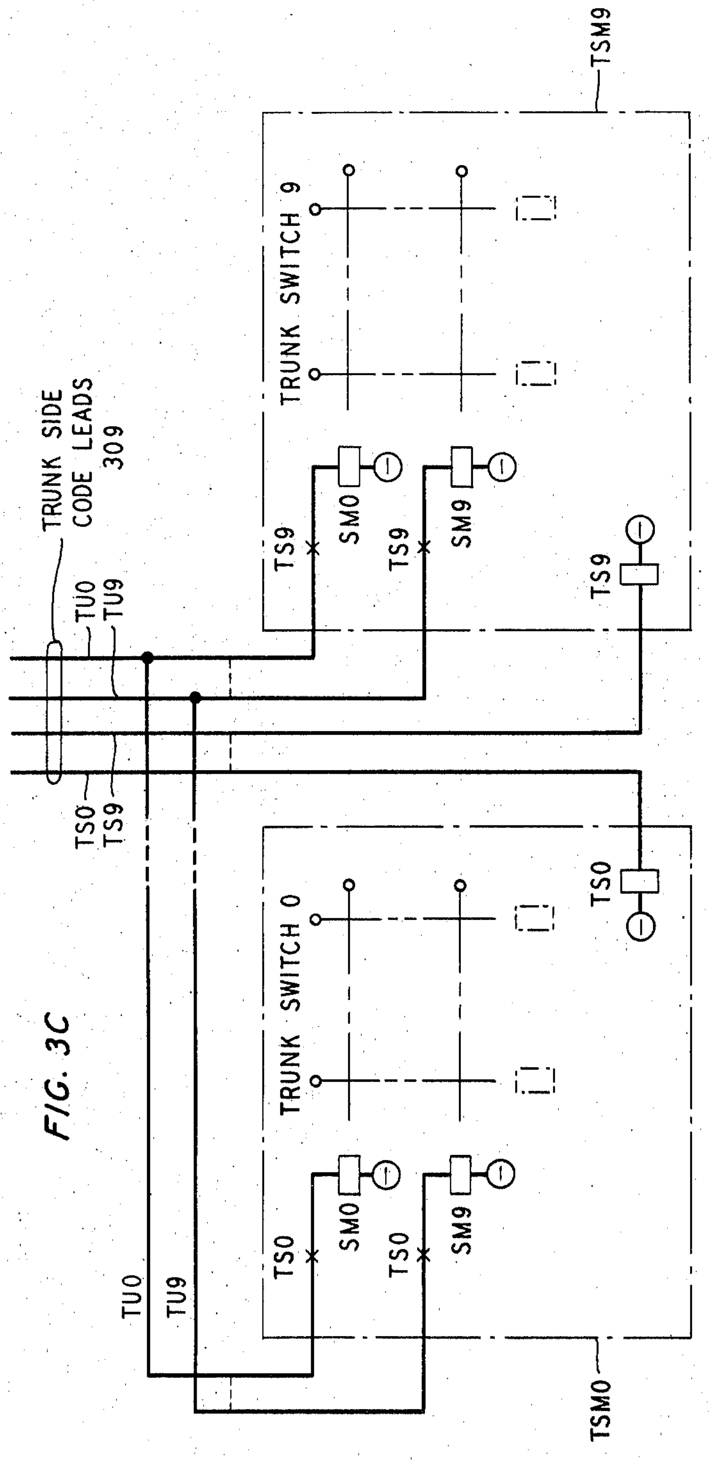
Figure 3D:
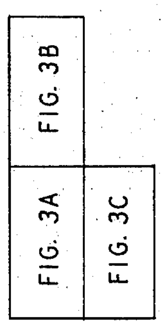

FIGS. 3A, 3B, and 3C, when arranged as shown on FIG. 3D, disclose the controller circuitry that receives information from the line side code leads 307 and the trunk side code leads 309 and, in turn, initiates the network circuit operations requird to establish a network connection between the two circuits identified by the code lead information. The line side code lead information is received in three-digit form. The H0 through H9 leads receive the hundredths digit information, the T0 through T9 leads receive the tens digit information, and the LU0 through LU9 leads receive the units digit information. The trunk side information is received in two-digit form. The TS0 through TS9 leads receive the tens digit and the TU0 through TU9 leads receive the units digit information. The three-digit line side information specifies the network appearance of the line circuit that is to be connected to a trunk side circuit; the two-digit trunk information specifies the network appearance of the trunk or register to which the identified line circuit is to be connected.

The hundredths digit of the line side information identifies the line module associated with the identified line circuit, the tens digit identifies the switched level or horizontal to which the line circuit is connected; the units digit specifies the switch to which the line circuit is connected.

The tens digit of the trunk code lead information identifies the trunk switch and the units digit identifies the level of the switch to which the identified trunk side circuit is connected.

With reference to FIG. 2, let it be assumed that line circuit 00 is to be connected to central office trunk circuit 0. As can be seen from FIG. 2, line circuit 00 is connected to the 0 level of line switch 0 of line module 0. Also, central office trunk circuit 0 is connected to level 0 of trunk switch 0. In order to establish a connection between these two circuits, the system controller 306 applies the three-digit code 000 to the line side code leads and applies the two-digit code 00 to the trunk side code leads. The hundredths digit of 0 for the line side code lead information is applied to conductor H0 and it operates relay LLM0 within line module 0. The operation of relay LLM0 indicates that line module 0 is to be involved on the connection. The operation of this relay closes its make contacts to connect the windings of relays LU0 through LU9 of this module to the units code leads LU0 through LU9. The 0 for the units digit of the line side code lead information is applied to leads LU0 and it operates relay LU0 of module 0. The LU0 relays of the remaining modules do not operate since the LLM- relays of the other modules are not operated. For example, relay LU0 of module 9 does not operate since its relay LLM9 is not operated and, thus, the winding of its LU0 relay is not connected to code lead LU0.

The operation of relay LU0 of module 0 closes its make contacts to extend the terminal 215-0 battery through resistor R0 to one side of the winding of all select magnets of line switch 0.

The tens digit of 0 for the line side code lead information is applied to conductor T0. This conductor extends to one side of the winding of the select magnet SM0 for level 0 of all switches in all line modules. Within line module LLM0, the potential on conductor T0 operates select magnet SM0 of line switch 0. The other side of the winding of this select magnet is currently connected via the make contacts of relay LU0 to negative battery on terminal 215-0. The SM0 select magnets of the other switches of the same modules do not operate at this time since none of relays LU1 through LU9 is not currently operated. The SM0 select magnets of other modules do not operate at this time since neither their LLM- or LU- relays are operated.

Thus, in summary of the above, the three-digit code 000 applied to the line side code leads 307 operates select magnet SM0 of switch 0 of line module 0. From a study of FIG. 2 it may be seen that line circuit 00 is served and connected to level 0 of switch 0 of line module 0. Therefore, the reception of this line side code functionally specifies that a connection is to be established from line circuit 00 to the trunk side circuit specified by the trunk side code lead information.

The hundredths digit of 0 for the trunk side code lead information is applied to conductor TS0 which extends from the system controller to relay TS0 of trunk switch module 0. This relay in operating closes its make contacts to interconnect the windings of relays SM0 through SM9 of the module with the code leads TU0 through TU9. The units digit of 0 for the trunk side code lead information is applied to conductor TU0 which at this time is connected to select magnet SM0 of trunk module 0 via make contacts TS0. This select magnet now operates. The corresponding select magnets of the other trunk modules are not connected to the TU0 through TU9 code leads at this time since the TS- relays, such as TS9 for trunk module 9, are not operated. Thus, the two-digit trunk code lead signal of 00 operates select magnet SM0 for trunk switch 0 and thereby specifies that trunk circuit 0, which is shown on FIG. 2, is to be connected to the line circuit specified by the signals applied to the line side code leads.

DESCRIPTION OF FIG. 4

Figure 4A:
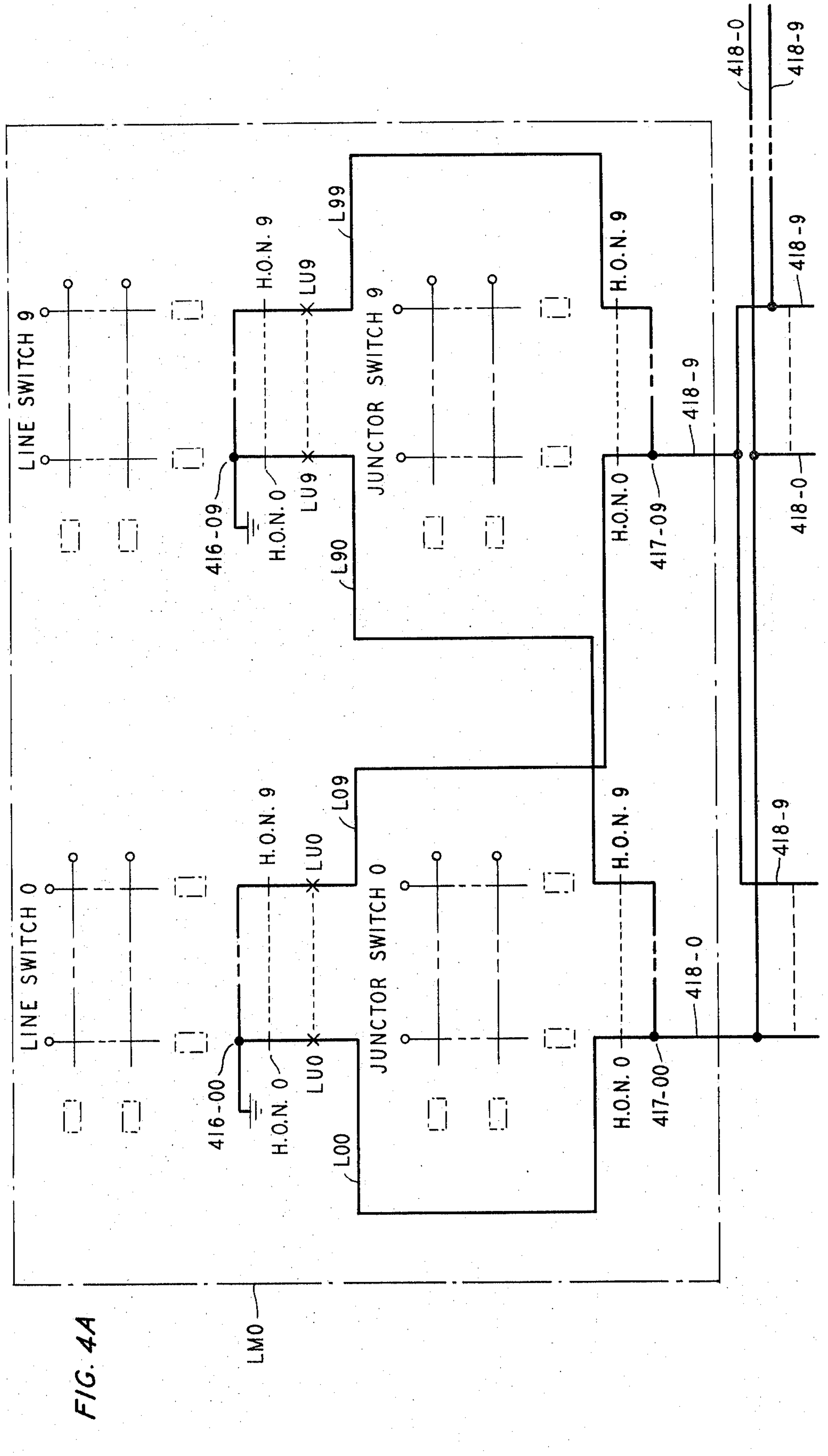
Figure 4B:
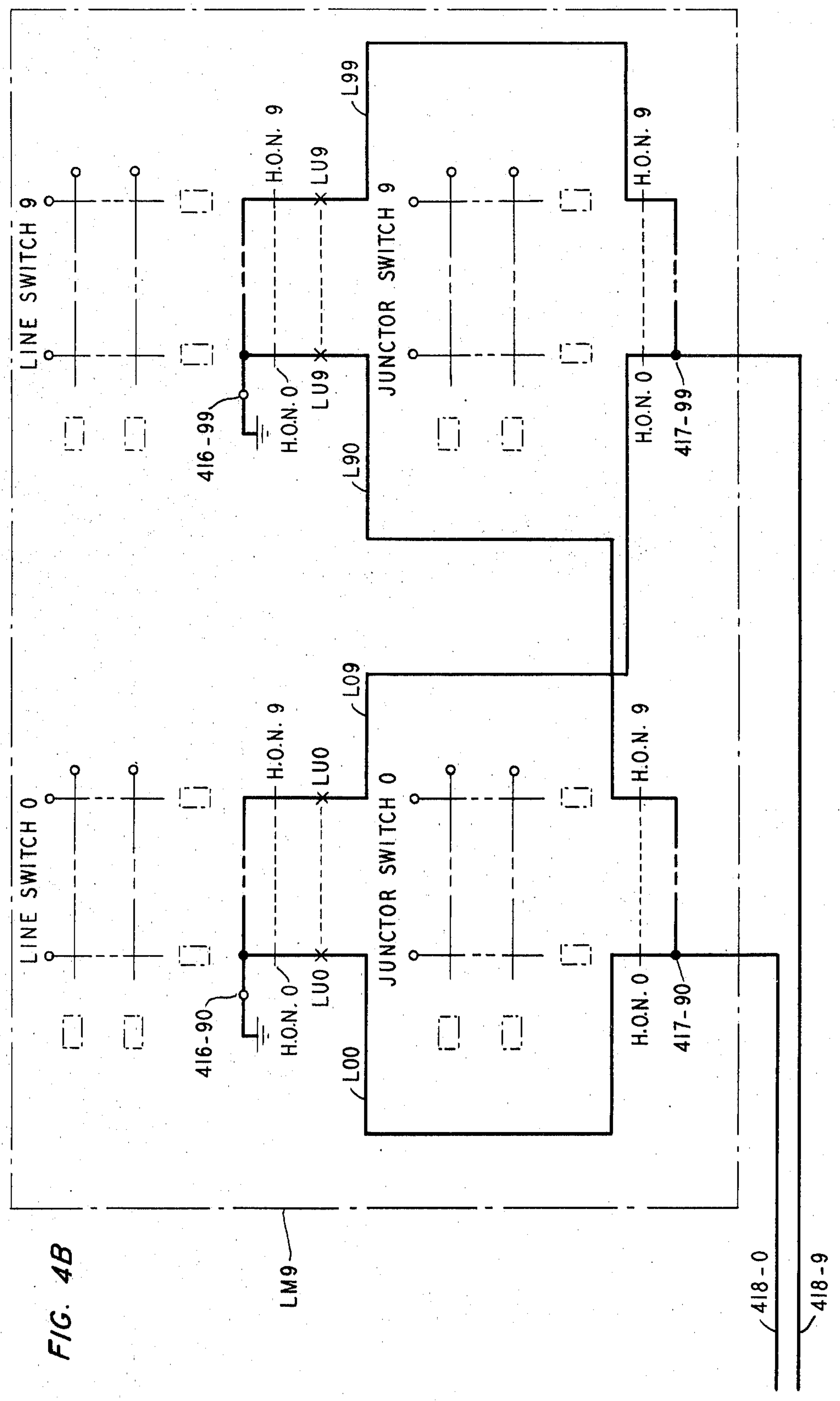
Figures 4C, 4D:
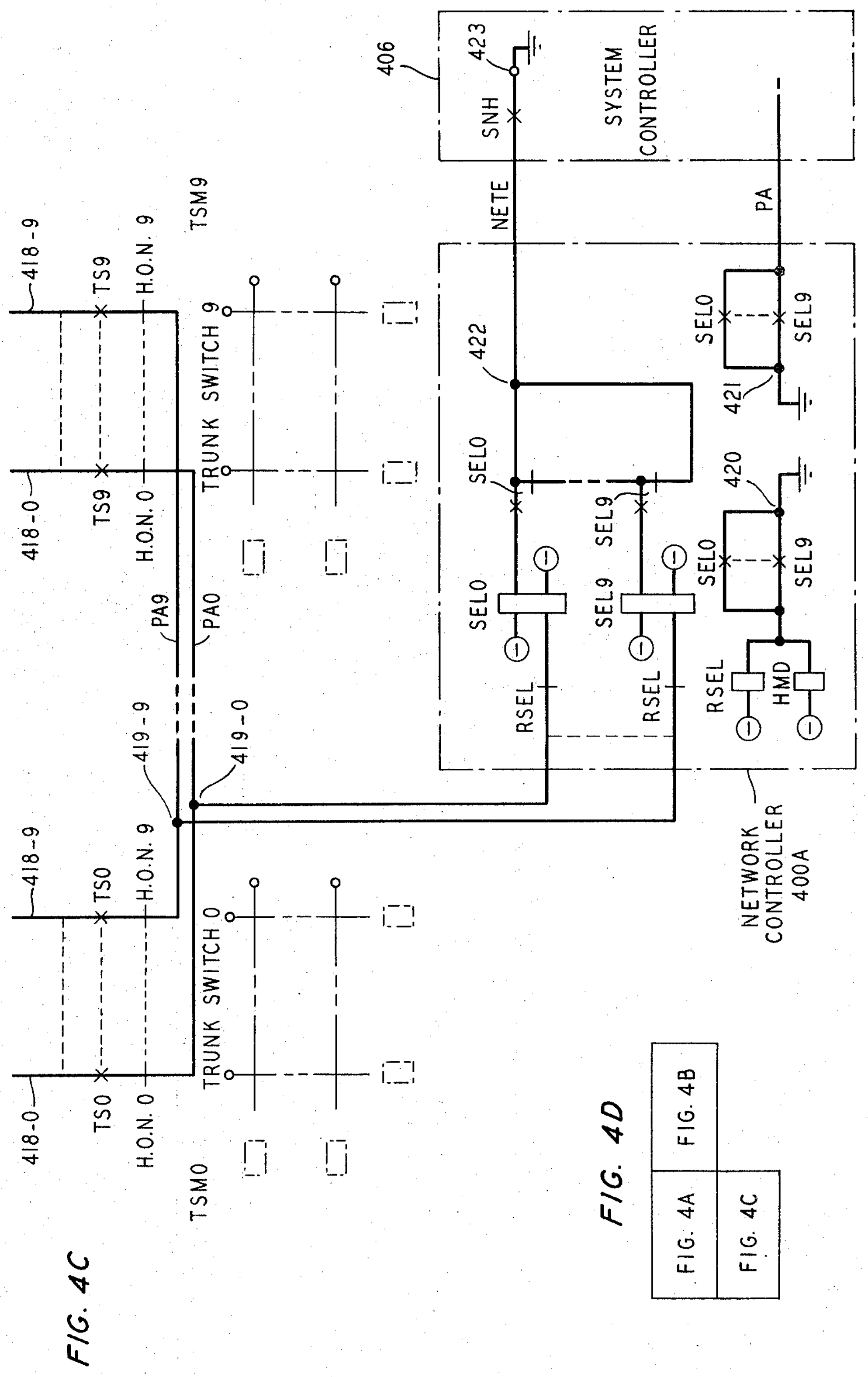

FIGS. 4A, 4B, and 4C, when arranged as shown on FIG. 4D, illustrate a portion of the path hunting circuitry of our invention. The circuitry of FIG. 4 responds to the receipt of the code lead signals and propagates a path hunting ground signal through the hold magnet OFF normal contacts associated with the switch serving the specified line circuit. This signal is further propagated over the hold magnet OFF normal contacts of the junctor switches to which the line switch is connected, over the hold magnet OFF normal contacts of the trunk switch serving the identified trunk circuit, and is extended to circuitry in the network controller. The controller then operates the switch control magnets required to set up a connection in response to the receipt of the propagated potential.

With respect to the currently described call connection, the operation of relay LU0 (of line module 0 on FIG. 3A) in response to the receipt of the units digit of 0 for the line side code lead information closes its make contacts on FIG. 4A associated with line switch 0 of line module 0. The closure of these contacts extends the terminal 416-00 ground through the OFF normal contacts of all idle hold magnets associated with line switch 0. From there, these grounds are applied to links LO0 through LO9 in accordance with the busy-idle state of the various hold magnets. At this time, all links associated with idle hold magnets receive the terminal 416-00 ground. In other words, if all hold magnets of the switch are idle, all of links L00 through L09 are grounded. On the other hand, if all hold magnets of the switch are busy, no link is grounded.

Let it be assumed that one or more hold magnets including the hold magnet for vertical 0 of the switch are idle. In this case, terminal 416-00 ground appears on link L00 which extends to the break contacts of the hold magnet for vertical 0 of junctor switch 0 within the same line module. From an inspection of FIG. 2, it may be seen that vertical 0 of line switch 0 is connected to vertical 0 of junctor switch 0 of the same line module. This being the case, a ground applied to link L00 of line module 0 will always be extended through the OFF normal break contacts of the hold magnet for vertical V0 of junctor switch 0 since this hold magnet will always be idle if the corresponding hold magnet for the line switch 0 is idle. This being the case, the ground on link L00 is now extended through the OFF normal contacts of hold magnet 0 of junctor switch 0 and appears on terminal 417-00. This terminal is connected to conductor 418-0 which extends from the terminal to the contacts of relays TS0 through TS9 each of which is associated with one of trunk switches TS0 through TS9, respectively. Of all of these relays, only relay TS0 is operated at this time in response to the receipt of the trunk code lead information. Specifically, the trunk code lead tens digit information of 0 specifies that the trunk involved on the connection is served by trunk switch 0. Therefore, the path hunting ground now on conductor 418-0 is extended through make contacts TS0 to the OFF normal contacts for vertical 0 of trunk switch 0. If this hold magnet of the switch is currently idle, the ground is further extended through its break contacts to terminal 419-0 and from there through break contacts of relay RSEL to the winding of relay SEL0 within the network controller to operate it. The reception of the ground by relay SELO signifies that a path which includes vertical 0 of trunk switch 0 is idle. If this is the only currently available idle path, relay SEL0 operates and closes a locking path for itself over its own make contacts to ground on terminal 422 from the system controller.

It is of course possible, if not probable, that more than one path will often be available upon the receipt of a connection request. For example, the preceding has described how a path may be completed from the specified line circuit to the specified trunk circuit over line switch 0, junctor switch 0, and trunk switch 0.

From an inspection of FIG. 2, it is apparent that a connection may be completed between the same two circuits over other portions of the network; namely, over any of the other junctor switches of the same line module providing that they are currently idle. Thus, with reference to FIG. 4 let it be assumed that the required elements on junctor switch 9 are idle. This being the case, the terminal 416-00 ground is extended over the break contacts for the hold magnet of vertical 9 of line switch 0, through make contacts of relay LU0, over link LO9, over the break contacts of the old magnet for vertical 0 of junctor switch 9 (assuming that this switch vertical is currently idle), to terminal 417-09 over conductor 418-9, through make contacts of relay TS0, through the hold magnet break contacts for vertical 9 of trunk switch 0 (assuming that this hold magnet is idle) to terminal 419-9. From there, the ground is further extended through break contacts of relay RSEL to the winding of relay SEL9. The locking circuit for all of relays SEL0 through SEL9 are arranged in a preference circuit in which relay SEL0 is the most preferred and in which relay SEL9 is the least preferred. This being the case, whenever a plurality of paths are available between any two specified circuits, a plurality of the SEL- relays will receive a propagated path hunting ground potential. All such relays will attempt to operate, but only the most preferred one of these will operate and lock over the preference circuit to ground on terminal 423 via make contacts of relay SNH. The operation of the most preferred one of the SEL- relays closes its make contacts to extend the terminal 420 ground to the winding of relays RSEL and HMD to operate them. Also, the operation of these relays extends the terminal 421 ground to conductor PA as a signal to common control to advise it that a path is currently available between the circuits specified by the line side and trunk side code lead signals.

DESCRIPTION OF FIG. 5

Figure 5A:
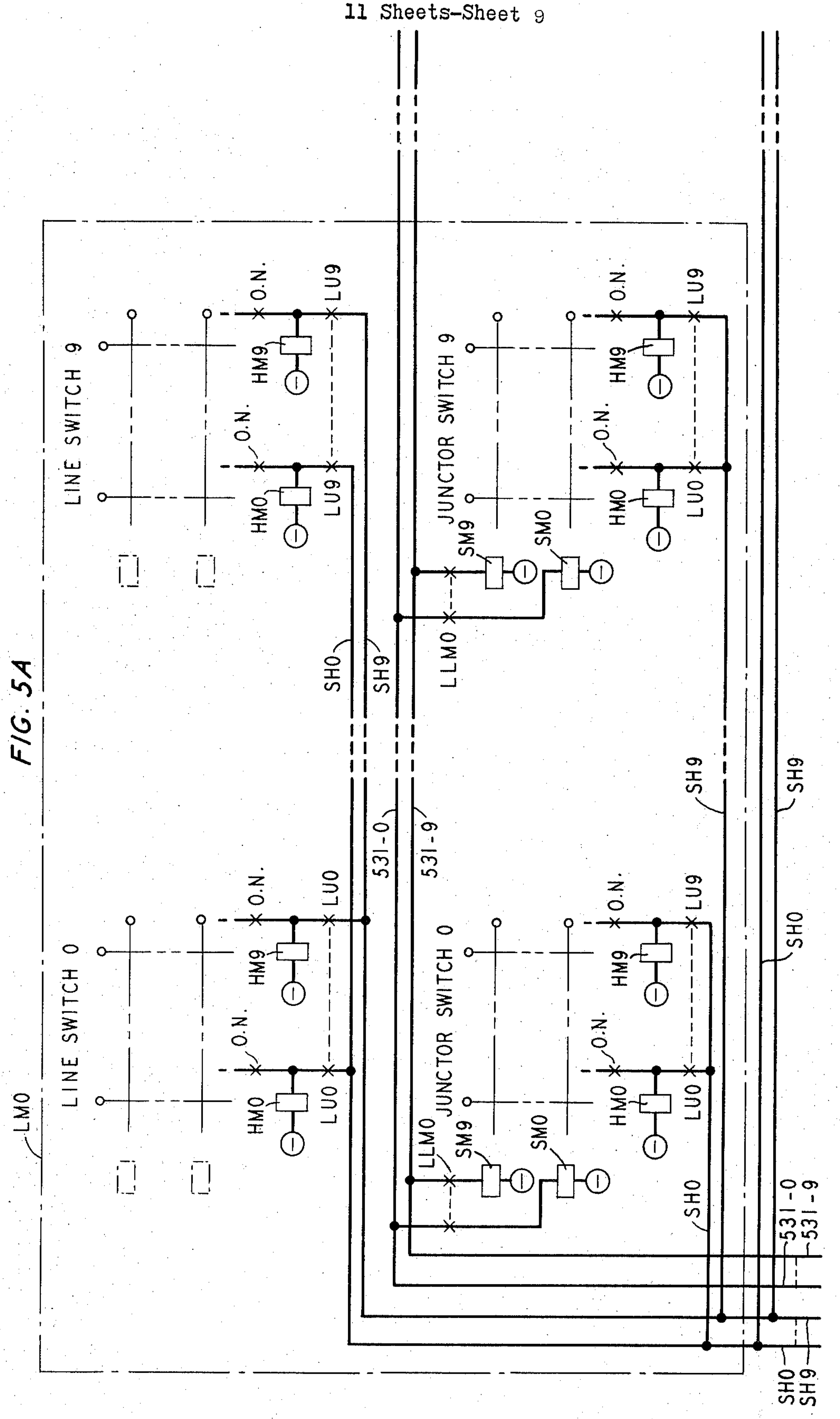
Figure 5B:
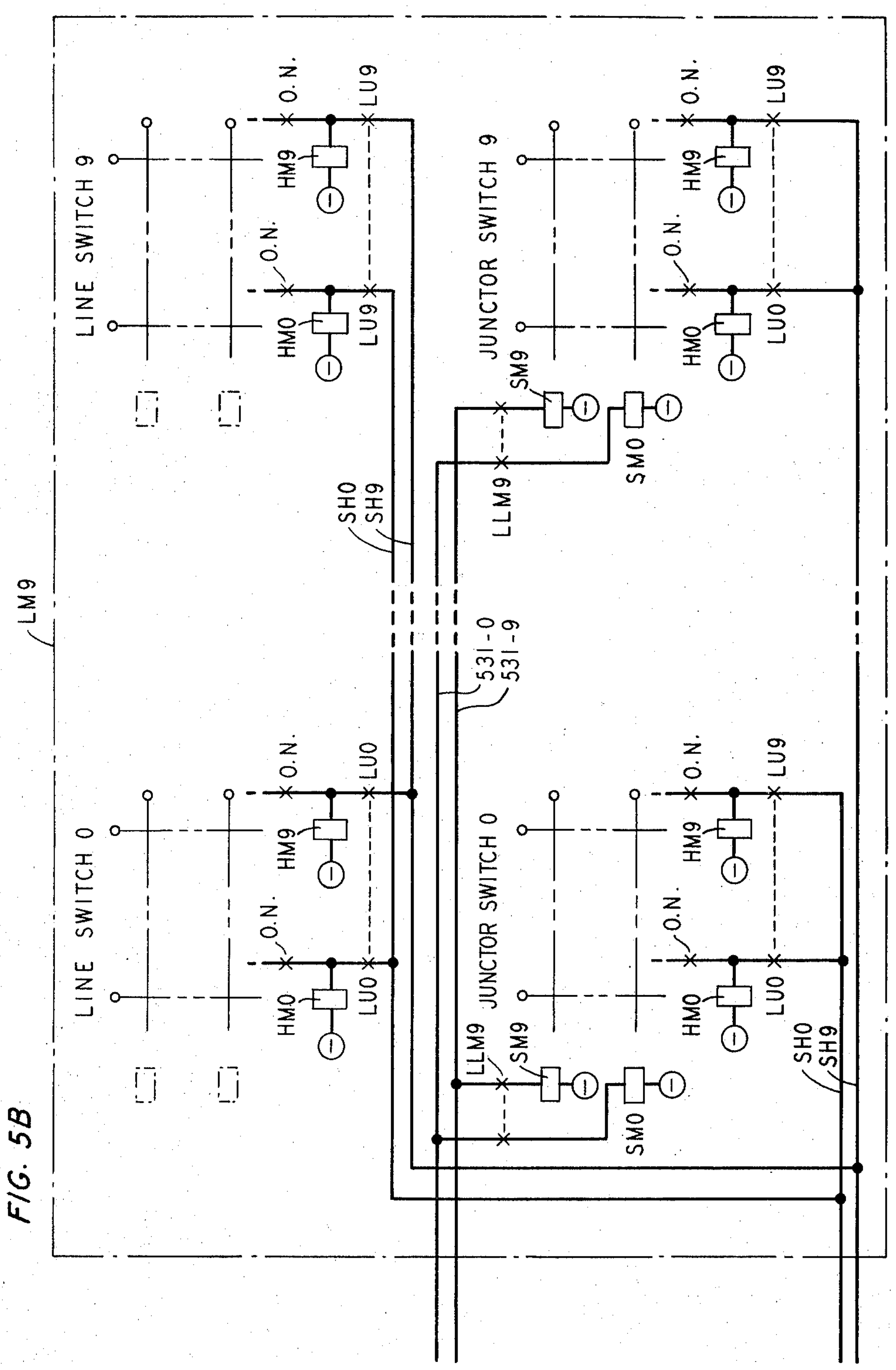
Figures 5C, 5D:
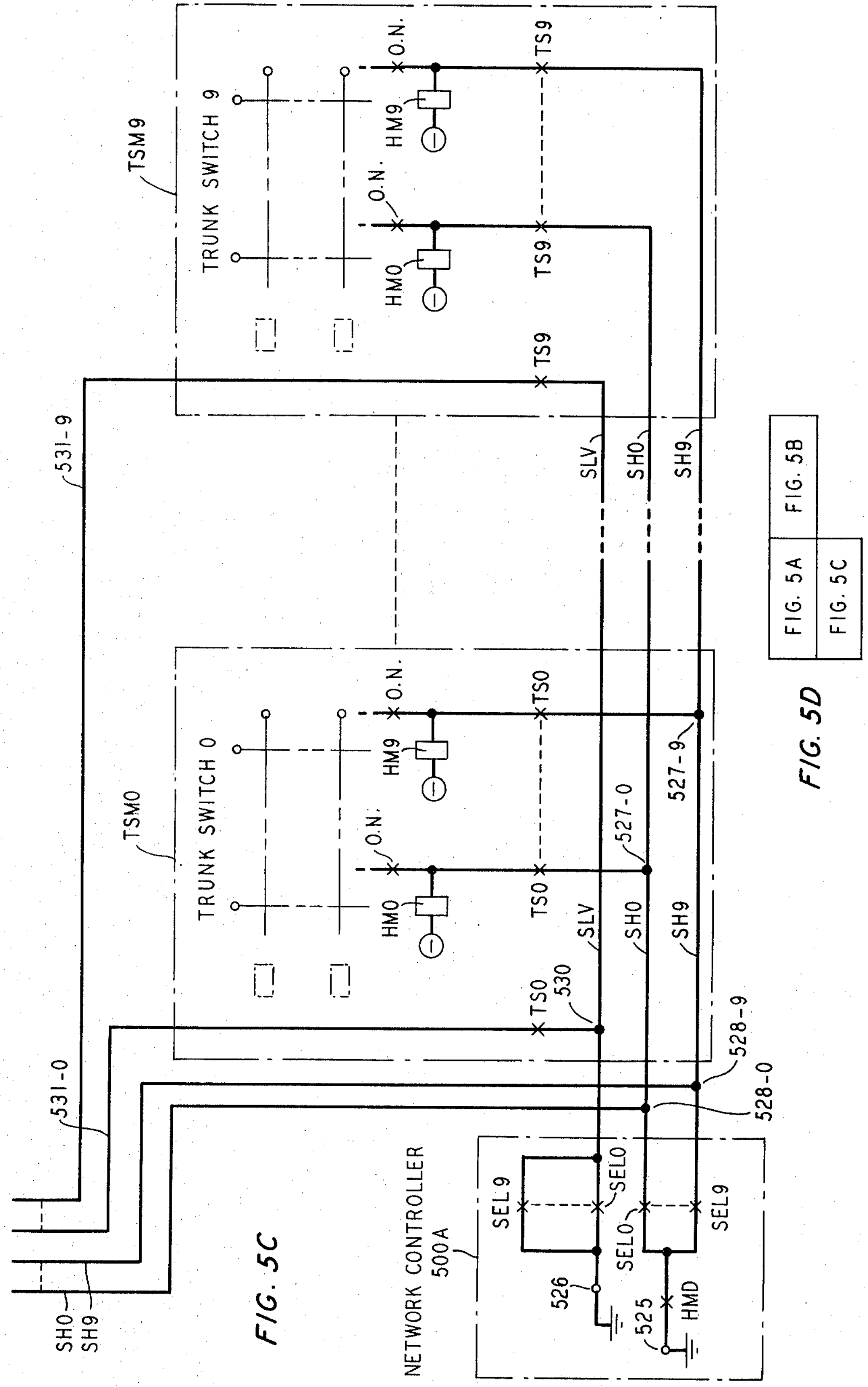

FIGS. 5A, 5B, and 5C, when arranged as shown in

FIG. 5D, illustrate the details of the circuitry which operates the switch magnets required to establish a network connection after a propagated ground potential is received by the network controller signifying that a path is currently available between the circuits specified by the line side and trunk side code lead signals.

The following describes the operation of the switch magnets required to establish a connection between line circuit 00 and trunk circuit 0. It is assumed in connection with this description that relay SEL0 operated on FIG. 4C in response to the reception of a propagated ground potential. On FIG. 5C, the terminal 525 ground is extended through make contacts HMD, through make contacts SEL0 to conductor SH0 and terminal 527-0. From there, it is further propagated through make contacts of relay TS0 to one side of the winding of hold magnet HM0 for vertical 0 of trunk switch 0. This ground potential operates the hold magnet. From FIG. 3C it can be seen that relay TS0 operated in response to the 0 for the tens digit of the trunk code lead signal and that select magnet SM0 for trunk switch 0 operated from the 0 for the units digit of the trunk code lead signal. Since this select magnet was priorly operated, the operation of hold magnet HM0 on FIG. 5C closes the switch crosspoints required to extend the path on FIG. 2 from central office trunk circuit 0, through the closed switch crosspoints to junctor J00 which extends to junctor switch 0 of line module 0. It may be appreciated from an inspection of FIG. 2 that the select magnet of level 0 of this junctor switch must be operated to extend the connection to a line circuit.

On FIG. 5C, the operation of relay SEL0 closes its make contacts to extend the terminal 526 ground to terminal 530. From there, the ground is extended through the make contacts of relay TS0, over conductor 531-0 extending from FIG. 5C to FIG. 5A. On FIG. 5A this ground is extended through make contacts of relay LLM0 to the winding of select magnets SM0 of the 0 level of each switch of line module 0.

Also on FIG. 5C, the ground appearing on conductor SH0 in response to the operation of relay SEL0 is extended from terminal 528-0 and over conductor SH0 which extends from FIG. 5C to FIG. 5A. On FIG. 5A this ground is extended through make contacts of relay LU0 to the winding of the hold magnet HM0 for the 0 vertical of junctor switch 0. Since the select magnet for the 0 level of the switch is already operated, the operation of this hold magnet closes the junctor switch crosspoints required to extend the connection from junctor J00 on FIG. 2 through the closed switched crosspoints to link 00 extending from junctor switch to line switch 0.

The ground on conductor SH0 of FIG. 5A is also extended through make contacts LU0 to the hold magnet HM0 of the line switch 0. The select magnet for the 0 level of the switch, namely, select magnet SM0 on FIG. 3A, operated from the line side code lead signals. Thus, the operation of hold magnet HM0 at this time closes the switch cross-points common to horizontal 0 and vertical 0 of the switch. This completes the connection between line circuit 00 and trunk circuit 0.

The circuitry of FIG. 5 is similarly effective to interconnect any other line side circuit with any other trunk side circuit in response to the receipt of code lead signals identifying the other circuit. The circuitry of our invention effects these interconnections without the use of a complicated expensive controller or without the use of circuitry that requires the sequential operation of a large number of relays for the path hunting and path establishment function.

What is claimed is:

1. In combination, a plural stage communication switching network having a network controller, a plurality of circuits connected to appearances on said network, a plurality of switches in each of said stages, means for transmitting signals to said controller specifying two of said circuits that are to be interconnected by the establishment of a path through said network, contacts on said switches for determining disjunct idle paths in said network extending between said specified circuits, means effective upon the reception of said signals for propagating a unique path defining potential stage by stage through all of said contacts associated with disjunct idle network paths extending between said specified circuits, means for extending each of said potentials propagated through all stages of said network over separate conductors to said network controller, and means including said controller responsive to the reception of one of said unique path defining potentials and to the reception of said signals for directlly establishing a network connection between said specified circuits simultaneously in all stages of said network exclusive of any further path determining means over the one of said idle disjunct paths defined by said last named potential.

2. In combination, a plural stage communication switching network having a line side stage and a trunk side stage, a plurality of switches in each of said stages, idle path indicating contacts on each of said switches, circuits connected to appearances on each of said sides, a network controller, means for transmitting signal information to said controller specifying two of said circuits that are to be interconnected by the establishment of a path through said network between its two sides, means in said controller for registering said signal information, means including said controller responsive to said registration for propagating a unique path defining potential from one of said sides to the other of said sides over the ones of said switch contacts that are associated with a currently idle disjunct network path extending between said specified circuits, means effective upon the propagation of each of said unique path defining potentials through said contacts between said two sides for extending said propagated potentials over separate conductors to said controller, and means controlled by said registering means and responsive to the reception of one of said unique path defining potentials by said controller for directly establishing a network connection simultaneously in all stages between said specified circuits over the disjunct network path defined by said last named potential exclusive of any further determining means.

3. In a switching system having a multistage network, said network having a line side stage and a trunk side stage, a network controller, a plurality of path segments in each of said stages, an idle state determining means for each of said path segments, circuits connected to said line side and trunk side stages, means for transmitting signals to said controller specifying two of said circuits that are to be interconnected by the establishment of a path through said network, means including said controller responsive to the reception of said signals for propagating a unique path defining potential through the determining means of each idle path segment extending through said line side stage to which one of said specified circuits is connected, means for extending each of said unique path defining potentials from said determining means of said line side stage to said trunk side stage to which the other one of said specified circuits is connected, means for propagating each of said unique path defining potentials from said last named determining means through the determining means associated with idle path segments of said trunk side stage to which said other specified circuit is connected, means effective upon the propagation of each of said unique path defining potentials through said last named determining means for extending said last named potentials over separate conductors to said controller, and means independent of said determining means and responsive to the reception of said signals and one of said last named potentials by said controller and exclusive of any further determining means for directly establishing a network connection simultaneously in all stages between said specified circuits over the idle path segments defined by said last named one potential.

4. The system of claim 3 wherein each of said stages comprises a plurality of matrix switches with each switch having two sets of coordinate conductors, means connecting one set of coordinate conductors of the switches comprising said line side and trunk side stages to said circuits, and means extending between said stages and interconnecting the other set of coordinate conductors of the switches of said line side and trunk side stages.

5. The system of claim 4 in which said idle state determining means comprises contacts of the ones of said switches whose conductors comprise said path segments extending between said specified circuits.

6. The system of claim 5 in which said system further comprises, a control magnet for each coordinate conductor of each of said switches, means including said establishing means for activating the control magnets associated with the one of said conductors that comprise said idle network path segments extending between said specified circuits, and means responsive to the activation of said magnets for interconnecting the switch conductors required to establish said connection between said specified circuits.

7. In a switching system having a multistage network and a network controller, said network having a line side stage and a trunk side stage, a plurality of switches in said line side and trunk side stages, idle path indicating contacts on each of said switches, conductors extending from each switch of said line side stage to the switches of said trunk side stage, a plurality of circuits connected to appearances on each of said switches, means in said controller for receiving and registering signals specifying two of said circuits that are to be interconnected by the establishment of a path through said network between said line side stage and said trunk side stage, means responsive to the reception of said signals by said controller for extending a unique path defining potential through the closed ones of said switch contacts associated with currently idle switch path segments connected to a first one of said specified circuits and extending from said one circuit, means for further disjunctly extending each of said unique path defining potentials from said last named contacts over said conductors to the switch to which a second one of said specified circuits is connected, means for further extending each of said unique path defining potentials through contacts of said last named switch associated with idle switch path segments extending to said second circuit, means effective upon the propagation of each of said potentials through said last named contacts for extending said potentials over separate conductors to said controller, and means independent of said contacts and responsive to the reception of one of said unique path defining potentials by said controller and exclusive of any further determining means for directy establishing a network connection simultaneously in all stages between said specified circuits over the idle path segments defined by said last named one potential.

8. The system of claim 7 wherein said switches comprise matrix type switches with each switch having two sets of coordinate conductors, means connecting one set of coordinate conductors of the switches comprising said line side and trunk side stages to said circuits, and means extending between said stages and interconnecting the other set of coordinate conductors of the switches of said line side and trunk side stages.

9. The system of claim 8 in which said system further comprises, a control magnet for each coordinate conductor of each of said switches, means including said establishing means for simultaneously activating the control magnets associated with the one of said conductors that comprise said idle network path extending between said specified circuits, and means responsive to the activation of said magnets for interconnecting the switch conductors required to establish said path between said specified circuits.

10. In a switching system having a multistage network anda network controller, said network having a line side stage and a trunk side stage, conductors connected between said line side stage and said trunk side stage, a plurality of circuits connected to appearances on each of said stages, means in said controller for registering signals specifying two of said circuits that are to be interconnected by the establishment of a path through said network from one of said stages to the other of said stages, idle state determining means for each path segment in each of said stages, means responsive to each registration of said signals by said controller for propagating a unique path defining potential through the idle state determining means associated with disjunct idle path segments extending through the stage to which a first one of said specified circuits is connected, means for further disjunctly extending each of said unique path defining potentials over said conductors to the stage to which a second one of said specified circuits is connected, means for further extending each of said potentials through idle state determining means of said last named stage, means for extending each of said unique path defining potentials from said last named determining means to said controller over separate conductors, and means in said controller including said registering means responsive to the reception of one of said last named potentials and exclusive of any further determining means for directly establishing a network connection simultaneously in all stages between said specified circuits over the path segments defined by said last named potential.

11. In combination, a multistage communication switching network having at least a line side stage and a trunk side stage, a network controller, a plurality of switches in said line side and trunk side stages, at least one path connecting each line side switch with each trunk side switch, circuits connected to appearances on said switches, means in said controller for receiving and registering signals specifying two of said circuits on different sides of said network that are to be interconnected by the establishment of a path through said network between said stages, means responsive to each registration of said signals by said controller for propagating a unique path defining potential over normally closed switch contacts representing disjunct idle network path segments extending from the switch connected to one of said specified circuits to the one of said switches on the other side of said network to which said other specified circuit is connected, means for further propagating each unique path defining potential received by said one switch through normally closed switch contacts representing disjunct idle path segments of said one switch to said controller, and means controlled by said registering means and responsive to the reception of only one of said potentials received by said controller and exclusive of any further determining means for directly establishing a network connection simultaneously in all stages between said specified circuits over the path segments defined by said last named one potential.

12. The combination of claim 9 wherein said network includes an intermediate stage connected between said line side and trunk side stages, wherein said switches comprise crossbar type matrix switches, and wherein said means for propagating comprises normally closed contacts of the control magnets of the ones of said matrix switches that comprise a portion of the path extending between said specified circuits.

13. The method of controlling a multistage communication switching network in the establishment of connections between circuits connected to appearances on opposite sides of said network, said method comprising the steps of 1. transmitting signals to a network controller to specify two of said circuits that are to be interconnected by establishment of a path through said network,
2. propagating a unique path defining potential through idle state determining means of each currently idle disjunct network path available through said network between said specified circuits,
3. extending to said controller each unique path defining potential that is propagated through each of said determining means that represents a currently available disjunct path through said network,
4. establishing a connection between said specified circuits over the path defined by a selected one of said propagated potentials extended to said controller with said path being directly established exclusive of any further determining means and under the cooperative control of said transmitted signals and said selected one potential.

14. The method of controlling a multistage communication switching network in the establishment of connections between circuits connected to appearances on opposite sides of said network, said method comprising the steps of 1. transmitting signals to a network controller to specify two of said circuits that are to be interconnected by the establishment of a path through said network,
2. propagating a unique path defining potential through normally closed contacts of all currently idle path segments of a network switch connected to one of said specified circuits,
3. extending each unique path defining potential that is propagated through each of said closed contacts to the network switch to which the other of said specified circuits is connected,
4. propagating each unique path defining potential received by said last named switch through normally closed contacts of a unique currently idle path segment of said last named switch,
5. applying to said controller each unique path defining potential that is propagated through said last named contacts,
6. establishing a path between said specified circuits over the path segments defined by a selected one of said propagated potentials extended to said controller with said path being established directly and simultaneously in all stages under the cooperative control of said transmitted signals and said one selected potential exclusive of any further determining means.

15. The method of controlling a multistage crossbar switching network in the establishment of connections between circuits connected to line side and trunk side appearances on said network, said method comprising the steps of 1. transmitting signals to a network controller specifying a line side and a trunk side circuit that are to be interconnected by the establishment of a path through said network,
2. propagating a unique path defining potential through normally closed contacts of all currently idle path segments of a line side switch connected to said specified line side circuit,
3. extending each such potential propagated through said closed contacts to an intermediate stage of said network,
4. further extending each unique path defining potential through intermediate stage normally closed switch contacts associated with currently idle path segments extending between said specified circuits,
5. propagating each unique path defining potential that is extended through said last named contacts to a trunk side switch to which said specified trunk side circuit is connected,
6. propagating each unique path defining potential received by said trunk side switch through normally closed switch contacts of currently idle path segments of said trunk side switch,
7. applying to said controller each unique path defining potential that is propagated through said contacts of said last named trunk side switch,
8. establishing a path between said specified circuits over the path segments defined by a selected one of said potentials extended to said controller.

* * * * *

UNITED STATES PATENT OFFICE

CERTIFICATE OF CORRECTION

Patent No. 3,859,470 Dated January 7, 1975

Inventor(s) Robert George Dittrich and Louis Emanuel Thelemaque

It is certified that error appears in the above-identified patent and that said Letters Patent are hereby corrected as shown below:

Column 5, line 15, after "contains" and before "line" delete "10" and insert --ten--;
line 15, after "switches and" and before "junctor" delete "10" and insert --ten--;
line 16, after "The" and before "line" delete "10" and insert --ten--;
line 17, after "the" and before "junctor" delete "10" and insert --ten--;
line 27, after "the" and before "horizontals" delete "10" and insert --ten--;
line 28, after "to" and before "central" delete "10" and insert --ten--;
line 28, after "the" delete "10" and insert --ten--.

Column 7, line 43, change "LOO" to read --L00--; and"LO9" to read --L09--.

Column 8, line 38, after "link" delete "LO9" and insert --L09--;
line 38, after "the" and before "magnet" delete "old" and insert --hold--.

Column 12, line 33, before "network" delete "anda" and insert --and a--.

Signed and sealed this 15th day of April 1975.

([illegible])
Attest:

[illegible] C. [illegible]
Attesting Officer

C. MARSHALL DANN
Commissioner of Patents
and Trademarks